United States Patent [19]

Mehta

[11] Patent Number: 4,888,220
[45] Date of Patent: Dec. 19, 1989

[54] DECORATIVE LAMINATES HAVING 3-DIMENSIONAL EFFECT

[75] Inventor: Mahendra Mehta, Pickerington, Ohio

[73] Assignee: The Mead Corporation, Dayton, Ohio

[21] Appl. No.: 233,183

[22] Filed: Aug. 16, 1988

Related U.S. Application Data

[63] Continuation-in-part of Ser. No. 101,707, Sep. 28, 1987, abandoned.

[51] Int. Cl.⁴ .............................................. B32B 29/00
[52] U.S. Cl. ....................................... 428/15; 162/134; 428/106; 428/342; 428/530; 428/908.8
[58] Field of Search ................. 428/15, 106, 342, 530, 428/908.8; 162/134

[56] References Cited

U.S. PATENT DOCUMENTS

| | | | |
|---|---|---|---|
| 3,125,484 | 3/1964 | Weiss | 428/246 X |
| 3,223,579 | 12/1965 | Dorland et al. | 428/537.5 X |
| 3,451,878 | 6/1969 | Fung et al. | 428/67 X |
| 3,718,536 | 2/1973 | Downs et al. | 428/903.3 X |
| 3,940,538 | 2/1976 | Palazzolo et al. | 428/531 X |
| 4,044,185 | 8/1977 | McCaskey, Jr. et al. | 428/153 |
| 4,154,882 | 5/1979 | Ungar et al. | 428/165 |
| 4,219,598 | 8/1980 | Noma et al. | 428/161 |
| 4,460,655 | 7/1984 | Jacobson | 428/342 X |
| 4,476,193 | 10/1984 | Seidel et al. | 428/531 |
| 4,724,187 | 2/1988 | Ungar et al. | 428/530 X |
| 4,797,308 | 1/1989 | Mattin | 428/15 |
| 4,810,540 | 3/1989 | Ellison et al. | 428/908.8 |
| 4,835,023 | 5/1989 | Taniguchi et al. | 428/15 |

*Primary Examiner*—Henry F. Epstein
*Attorney, Agent, or Firm*—Smith & Schnacke

[57] ABSTRACT

A decorative laminate comprising a plurality of consolidated resin impregnated fiberous sheets, at least one of said sheets being formed from bleached cellulose fibers, titanium dioxide and/or a pearl pigment.

20 Claims, 1 Drawing Sheet

DECORATIVE LAMINATES HAVING 3-DIMENSIONAL EFFECT

CROSS-REFERENCE TO RELATED APPLICATION

This application is a continuation-in-part of U.S. application Ser. No. 101,707 filed Sept. 28, 1987, now abandoned.

BACKGROUND OF THE INVENTION

High-pressure decorative laminates are laminated articles comprising plural layers of synthetic resin impregnated paper sheets consolidated or bonded together into a unitary structure under high heat and pressure. Conventionally, the decorative or print layer is a sheet of high quality cellulose fiber impregnated with a thermosetting condensation resin such as melamine formaldehyde resins. The decorative sheet may be overlayed with a low basis weight transparent sheet, which is also a sheet of cellulose impregnated with melamine formaldehyde resin. These sheets are bonded to a plurality of core or body sheets of a fiberous cellulosic material, usually unbleached Kraft paper, impregnated with a thermosetting phenol-formaldehyde resin. Typically, seven or eight core sheets are consolidated with only a single decorative sheet and a single overlay sheet to form a decorative laminate.

It is an object of the present invention to provide a decorative laminate having the 3-dimensional or depth-like effect such as the effect of true marble or tree wood grain.

This and other objects will become apparent from the present invention which provides a decorative laminate comprising a plurality of melamine-formaldehyde resin impregnated fiberous sheets made out of bleached fibers wherein at least one of said sheets contains titanium dioxide and pearl pigment.

DETAILED DESCRIPTION

Figure 1:
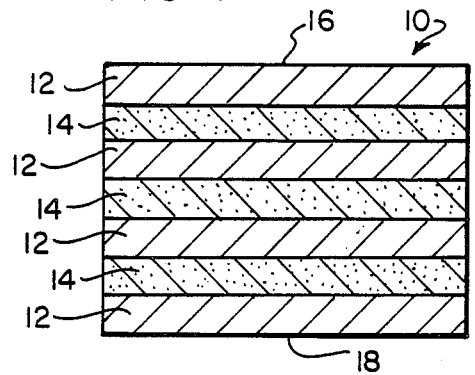
FIGS. 1-4 are cross sections through decorative laminates in accordance with the present invention.

In accordance with the present invention, titanium dioxide and/or pearl pigment are added to the paper furnish for the decor sheet to provide a controlled level of opacity and a translucent effect which imparts a 3-dimensional effect to any pattern pressed within the laminate structure. By "controlled level of opacity" is meant that the resin saturated paper sheet exhibits diffused transmission. Diffused transmission occurs when light penetrates an object, scatters and emerges diffusely on the other side. The transmitted light leaves the object in all directions. In a totally transparent material, the light passes without diffusion. Preferably the sheet transmits at least 50% of the incident light but is not totally transparent.

The diffused transmission of light in a 3-dimensional decor sheet in accordance with this invention is provided by using a furnish containing about 90 to 99.5% cellulose fibers, and about 0.5 to 10% titanium dioxide or pearl pigment. The amount of pigment which may be used will depend on the basis weight of the paper and the degree of translucency desired as shown in the following table.

| Basis Weight (lbs) | TiO$_2$ and/or Pearl Pigment (%) |
| --- | --- |
| 20–50 | 0.5–10 |
| 50–100 | 0.5–5 |
| 100–200 | 0.5–2 |

Pearl pigments are thin flakes of mica coated with titanium dioxide. While this application makes reference to titanium dioxide, those skilled in this art will appreciate that equivalent opacifying pigments may be used in place of or in combination with titanium dioxide such as clay, amorphous silica, etc. The amount of titanium dioxide and pearl pigment should be adjusted within the aforesaid ranges to provide the 3-dimensional translucent effect. The combined amount of titanium dioxide and pearl pigment should not exceed about 10%.

The cellulose fibers used in the present invention are preferably a bleached Kraft pulp. The pulp may consist of hardwoods or softwoods or a mixture of hardwoods and softwoods. Higher alpha cellulose such as cotton may be added to enhance characteristics such as postformability.

Additives such as alum, alkali and the like may be used to control end use characteristics such as postforming. Wet strength resins may be added for wet strength characteristics. A retention aid may also be used if desired.

The basis weight of the sheets may range from approximately 20 to 200 pounds per 3000 square feet and preferably ranges from approximately 60 to 120 pounds per 3000 square feet.

The 3-dimensional decor sheets are prepared, dried and impregnated in an otherwise conventional manner. The sheets are preferably impregnated with commercially available melamine formaldehyde or polyester laminating resins and dried to a non-tacky but fusible B-stage.

FIGS. 1-4 illustrate various laminate constructions which may be used in accordance with the present invention. In accordance with the preferred embodiments of the invention, the decor sheet described above is used in combination with other sheets prepared from the same furnish which are randomly pigmented or coated with colored pigments or printed as desired (hereafter these sheets will be genericly referred to as "printed 3-dimensional decor sheets.") The laminate may also contain conventional unbleached Kraft core stock.

Various patterns may be printed or created in these 3-dimensional decor sheets. Most typically, a marble grain or wood grain pattern or portions of a marble pattern or wood grain pattern such as selected colored streaks will be printed on these sheets. A typical laminate includes a number of the above described unprinted sheets and a number of printed 3-dimensional decor sheets. Such laminates demonstrate the phenomenon of diffused reflection. When such a laminate is viewed by an observer, the incident light is reflected from printed areas of various layers of the laminate thus providing a 3-dimensional effect.

The number of sheets making up a laminate will depend upon the thickness of the laminate which is desired, the basis weight of the papers used and the depth of the 3-dimensional effect desired. The laminate may range from 1/16 to ½ inch thick and preferably 1/12 to 1/5 inch thick. In most instances, the laminate will contain approximately 5 to 8 sheets. In other cases, however, where a thick laminate is desired, the laminate may contain up to 40 3-dimensional decor sheets. On the other hand, if a heavier basis weight paper is used, the laminate may be formed from as few as two or three 3-dimensional decor sheets.

In accordance with the preferred embodiments of the invention, the top sheet of the laminate is an unprinted 3-dimensional decor sheet containing titanium dioxide and pearl pigment. The bottom sheet of the laminate can be an unprinted sheet or a printed sheet or a white sheet containing a high loading of titanium dioxide (a barrier sheet) or a solid colored decorative sheet containing a high concentration of a colored pigment (solid color decor or print base sheet).

FIG. 1 illustrates one embodiment of the present invention wherein the laminate 10 comprises a plurality of above described unprinted 3-dimensional decor sheets containing titanium dioxide and/or pearl pigment 12 and randomly pigmented or printed 3-dimensional decor sheets 14. In accordance with the embodiment illustrated in FIG. 1, the top and bottom sheets 16 and 18 are unprinted sheets containing titanium dioxide and pearl pigment. The balance of the laminate is formed from alternating pigmented or printed and unprinted sheets.

Figure 2:
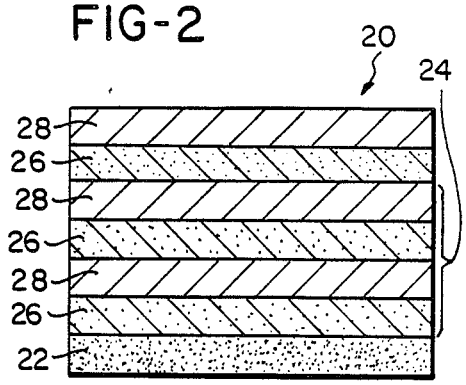

FIG. 2 illustrates an embodiment of the invention in which the laminate 20 includes an unprinted top sheet 28 and an opaque white barrier sheet 22 containing a high loading of titanium dioxide as the bottom sheet. The core sheets 24 are alternating 3-dimensional decor sheets of printed 3-dimensional decor sheets 26 and unprinted 3-dimensional decor sheets 28 containing titanium dioxide and/or pearl pigment. This laminate exhibits an enhanced 3-dimensional effect.

The laminate illustrated in FIG. 2 can be modified to include a solid colored sheet as the bottom sheet 22 instead of the high opacity white sheet. In this case, a 3-dimensional effect against a colored background is obtained.

Figure 3:
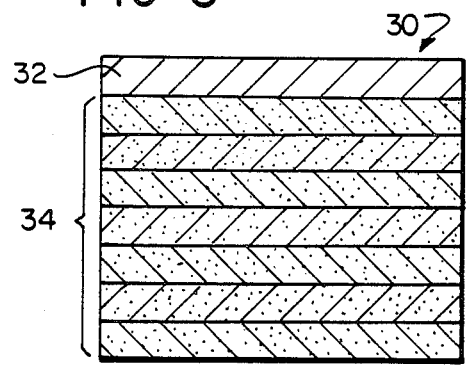

FIG. 3 illustrates another embodiment of the invention in which the laminate 30 includes an unprinted 3-dimensional top sheet containing titanium dioxide and/or pearl pigment 32 and the balance of the laminate is printed 3-dimensional decor sheets 34.

Figure 4:
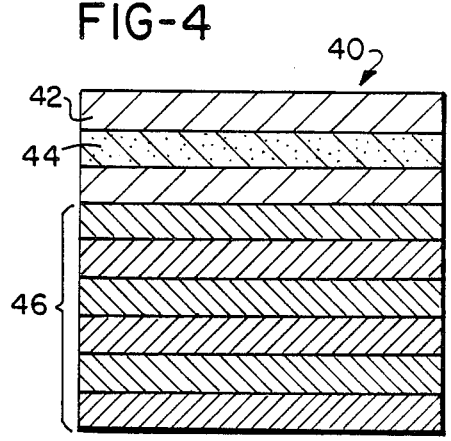

The 3-dimensional effect can be achieved in as few as two or three 3-dimensional decor sheets of this invention. Consequently, another embodiment of the invention resides in a laminate comprising 2 or more printed and/or unprinted 3-dimensional decor sheets in a laminate with a plurality of conventional unbleached Kraft core sheets. The printed or unprinted sheets in accordance with the present invention are adjacently positioned at the surface of the laminate. The top sheet of the laminate should be an unprinted 3-dimensional decor sheet. The unbleached Kraft sheets are positioned below and contribute additional overall strength to the laminate. FIG. 4 illustrates one example of this embodiment of the invention in which the laminate 40 includes an unprinted top and third sheet containing $TiO_2$ and pearl pigment 42 and printed second sheet 44 and a number of unbleached Kraft core sheets 46.

In accordance with another embodiment of the invention, the laminates illustrated in FIG. 1–3 may additionally include an overlay on the top surface of the laminate. This overlay may be tinted to modify the aesthetic effect of the laminate, or an abrasion-resistant overlay may be used.

The Examples in attached figures are only for illustration. Any number of combinations of unprinted and printed 3-dimensional decor sheets are possible based upon the desired effect. The location of printed sheet can vary based upon print intensity and sheet composition, e.g., for a given effect, the lightly printed sheet may be the second sheet from the top and heavily printed sheet may be third or fourth sheet from the top. The remaining top sheets in such case will be unprinted sheets. A single sheet containing high level of $TiO_2$ and/or pearl pigment within the ranges defined earlier can be replaced by two or three sheets containing reduced levels of $TiO_2$ and pearl pigment to get the same effect.

Laminates in accordance with the present invention may be provided with glossy, matt or satin finishes in a known manner. Furthermore, properties such as flame retardant characteristics, abrasion resistance can be introduced during the papermaking process using technology which is already available.

The present invention is illustrated in more detail by the following non-limiting example.

EXAMPLE 1

A furnish containing 70% bleached hardwood, 28% bleached softwood, 1% titanium dioxide, 1% pearl pigment, and a wet strength resin was prepared and formed into a 90 lb. sheet on a fourdrienor pilot paper machine hereinafter referred to as the "3-dimensional unprinted sheet". Several of the unprinted sheets were printed with a marble pattern to form "3-dimensional printed sheet".

The printed and unprinted sheets were saturated with a melamine-formaldehyde thermosetting resin and the saturated sheets were cured to a B-stage by heating at 250° F. for 4 minutes. The B-stage printed and unprinted sheets were alternately positioned in a book. The top sheet is an unprinted sheet. The book was pressed in a laboratory laminating press at 350° F. and 1000 psi for 10 minutes and cooled under pressure for 5 minutes. The laminate thus obtained had a 3-dimensional marble effect.

Those skilled in the art will appreciate that any conventional laminating resin can be used in the present invention including phenolics, expoxies, and polyester impregnating resins.

EXAMPLE 2

A furnish containing 97% bleached hardwood, 2% titanium dioxide and 1% pearl pigment and a wet strength resin was used to prepared printed and unprinted sheets as in Example 1. These sheets were saturated with a laminating resin and laminated as described in Example 1. The laminate thus obtained had a 3-dimensional marble effect, however, the effect was less enhanced than in the laminate of Example 1.

Having described the invention in detail and by reference to preferred embodiments thereof, it will be apparent that modifications and variations are possible without departing from the scope of the invention defined in the appended claims.

What is claimed is:

1. A decorative laminate comprising a plurality of consolidated resin impregnated fiberous sheets, at least one of said sheets being a 3-dimensional decor sheet formed from bleached cellulose fibers and titanium dioxide and/or pearl pigment, wherein the combined amount (dry weight) of titanium dioxide and/or pearl pigment is such that said sheet exhibits diffused transmission characteristics and bears the following relationship to the basis weight of the sheet.

| Basis Weight (lbs) | TiO₂ and/or Pearl Pigment (%) |
| --- | --- |
| 20–50 | 0.5–10 |
| 50–100 | 0.5–5 |
| 100–200 | 0.5–2 |

2. The decorative laminate of claim 1 wherein said laminate includes at least one of said 3-dimensional decor sheets which is printed and at least one of said 3-dimensional decor sheets which is unprinted.

3. The decorative laminate of claim 2 wherein at least one of said 3-dimensional printed decor sheets is positioned above the uppermost of said printed decor sheets in said laminate.

4. The decorative laminate of claim 3 wherein said 3-dimensional printed or unprinted decor sheets are alternately positioned within said laminate.

5. The decorative laminate of claim 2 wherein the bottommost sheet in said laminate is a high opacity white or colored sheet.

6. The decorative laminate of claim 1 wherein said 3-dimensional decor sheet contains TiO₂ and pearl pigment.

7. The decorative laminate of claim 1 wherein said cellulose fibers include hardwood and softwood fibers.

8. The decorative laminate of claim 2 wherein, with the possible exception of said bottommost sheet, said laminate consists essentially of said printed and unprinted 3-dimensional decor sheets.

9. The decorative laminate of claim 3 wherein said printed and unprinted decor sheets are positioned in said laminate to provide a 3-dimensional effect.

10. The decorative laminate of claim 3 wherein an overlay is positioned on the surface of the uppermost of said decor sheets 11. The decorative laminate of claim 10 wherein said overlay is a high abrasion overlay to impart mar and scuff resistance.

12. The decorative laminate of claim 10 wherein said overlay is a tinted overlay.

13. The decorative laminate of claim 2 wherein the bottommost sheet in said laminate is an unprinted 3-dimensional decor sheet.

14. The decorative laminate of claim 3 wherein the bottommost sheet in said laminate is an unprinted 3-dimensional decor sheet.

15. The decorative laminate of claim 3 wherein at least one of said unprinted decor sheets is positioned below the bottommost of said printed decor sheets in said laminate.

16. The decorative laminate of claim 15 wherein an overlay is present as the uppermost and the lowermost sheet in said laminate.

17. The decorative laminate of claim 3 wherein said laminate additionally comprises at least one unbleached Kraft core sheet.

18. A sheet for use in a decorative laminate, said sheet being formed from bleached cellulose fibers and titanium dioxide and/or pearl pigment, said sheet having controlled opacity and diffused transmission such that said sheet is useful in providing a 3-dimensional effect to said laminate by reflecting light from various layers of said laminate wherein the combined amount of TiO₂ and pearl pigment bears the following relationship to the basis weight of said sheet.

| Basis Weight (lbs) | TiO₂ and/or Pearl Pigment (%) |
| --- | --- |
| 20–50 | 0.5–10 |
| 50–100 | 0.5–5 |
| 100–200 | 0.5–2 |

19. The sheet of claim 18 wherein said sheet contains titanium dioxide and pearl pigment.

20. The sheet of claim 19 wherein said cellulose fibers include hardwood and softwood fibers.

* * * * *